United States Patent [19]
Kawanaka et al.

[11] Patent Number: 5,381,241
[45] Date of Patent: Jan. 10, 1995

[54] METHOD FOR DISCRIMINATING BETWEEN FIGURE AND TEXT AREAS OF AN IMAGE

[75] Inventors: Seido Kawanaka; Shiro Ida; Hideo Takemura; Kouji Kumetani, all of Osaka, Japan

[73] Assignees: Sharp Corporation, Osaka; Ezel Inc., Tokyo, both of Japan

[21] Appl. No.: 928,012

[22] Filed: Aug. 11, 1992

[30] Foreign Application Priority Data

| Aug. 13, 1991 | [JP] | Japan | 3-228335 |
| Aug. 13, 1991 | [JP] | Japan | 3-228350 |
| Aug. 13, 1991 | [JP] | Japan | 3-228351 |

[51] Int. Cl.$^6$ .............................................. H04N 1/40
[52] U.S. Cl. ........................................ 358/462; 358/456
[58] Field of Search ................ 358/462, 93, 280, 282, 358/283, 456, 260, 447, 106, 457, 139, 466, 213, 166, 101, 125; 382/9, 53, 51, 54, 27, 48, 8, 50, 32

[56] References Cited

U.S. PATENT DOCUMENTS

| 4,400,738 | 8/1983 | Tomory et al. | |
| 4,547,811 | 10/1985 | Ochi et al. | 358/280 |
| 4,630,125 | 12/1986 | Roetling | 358/280 |
| 4,639,775 | 1/1987 | Cohen et al. | 358/106 |
| 4,729,035 | 3/1988 | Tanioka | |
| 4,742,557 | 5/1988 | Ma | 382/51 |
| 4,809,343 | 2/1989 | Wakabayashi et al. | 382/27 |
| 4,823,194 | 4/1989 | Mishima et al. | 358/282 |
| 4,860,371 | 8/1989 | Matsuyama et al. | 358/101 X |
| 4,941,190 | 7/1990 | Joyce | 382/54 |
| 4,941,192 | 7/1990 | Mishima et al. | 382/54 |
| 5,081,692 | 1/1992 | Kwon et al. | 358/447 |
| 5,153,925 | 10/1992 | Tanioka et al. | 382/52 |
| 5,189,710 | 2/1993 | Holt | 382/22 |
| 5,253,082 | 10/1993 | Hayashi et al. | 358/456 |
| 5,267,330 | 11/1993 | Masuda | 382/51 |
| 5,278,919 | 1/1994 | Sugiura et al. | 382/9 |

FOREIGN PATENT DOCUMENTS

| 0348703 | 1/1990 | European Pat. Off. . |
| 0362595 | 4/1990 | European Pat. Off. . |
| 0527488 | 2/1993 | European Pat. Off. . |
| 2167264 | 5/1986 | United Kingdom . |

*Primary Examiner*—Paul Ip
*Attorney, Agent, or Firm*—Cushman, Darby & Cushman

[57] ABSTRACT

The present invention relates to a method for discriminating between figure areas, e.g., half-tone photographs, drawings and the like, and text areas in an image. More specifically, an image is processed to determine the difference between maximum and minimum brightnesses in convolutions thereof. When the difference between the maximum and minimum brightnesses is less than or equal to a predetermined level, the center pixel in the convolution is determined to be a half-tone pixel. A half-tone area is detected by determining areas of the image having at least a predetermined number of half-tone pixels. In another aspect of the invention, contiguous areas of the image having fewer than a predetermined number of configuration pixels are determined to be vacant areas having neither figure nor character information.

35 Claims, 11 Drawing Sheets

METHOD FOR DISCRIMINATING BETWEEN FIGURE AND TEXT AREAS OF AN IMAGE

FIELD OF THE INVENTION

The present invention relates to method for classifying character a area to be binarized, picture area to be expressed as a gray scale area and a background area, in 1 facsimile, OCR of other image input system.

The extraction of background area is useful for inserting an image into the background area, that is, vacant area.

BACKGROUND OF THE INVENTION

Conventionally, image processing may be performed by binarizing an image and regarding the parts with high brightness and low brightness as a half tone area and a character area, respectively. In the case that a dark colored or blackish photograph with rather low brightness is processed, the half-tone area and characters area are processed by the same technique using this method. Consequently, image after the processing lacks a stereoscopic effect and has a flat impression.

In some editorial works, it is necessary to combine sentences and pictures by cutting and pasting.

In order to fit a portion of a paper in a vacant area of another paper, the vacant area be exactly extracted because it must be clear before the insertion whether the area to be inserted fits the area as it is; if not, it must be contracted and the contraction scale must be determined. Automatic extraction of the vacant area is necessary to automatically insert an image into a vacant area of another image. However, a method for automatically extracting a vacant area does not heretofore exist, so far as the present inventors know.

SUMMARY OF THE INVENTION

The present invention solves the above conventional problems and provides a area classification method for precisely extracting an image area having half-tone brightness, such as a picture or a photograph.

Another object of the present invention is to provide a method of extracting vacant and configuration areas in an image.

The above objects are attained as follows.

First, half-tone pixels are extracted from an input image according to a brightness differential in predetermined convolution, as well as maximum and minimum brightnesses.

It is possible to extract the half-tone area precisely.

Second, the input image is binarized an divided into unit areas of predetermined size. Configuration pixels are counted in each unit area so that consecutive unit areas which include a number of configuration pixels equal to or less than a predetermined number are defined as candidate portions of vacant 1 area, and the maximal horizontal rectangle (not rotated, inclined or declined) internally touching the candidate area is deemed as a vacant area.

A vacant area can be extracted optimally to be inserted into another image at high speed.

On the contrary, the configuration area can be extracted by extracting unit areas of a predetermined number equal to or greater than the number configuration pixels.

BRIEF DESCRIPTION OF THE DRAWINGS

FIGS. 10A–10D are a flow chart of a second embodiment of the present invention.

PREFERRED EMBODIMENT OF THE PRESENT INVENTION

Hereinafter, an embodiment of an area classification method according to the present invention is described with reference to the attached drawings.

Figure 1A:
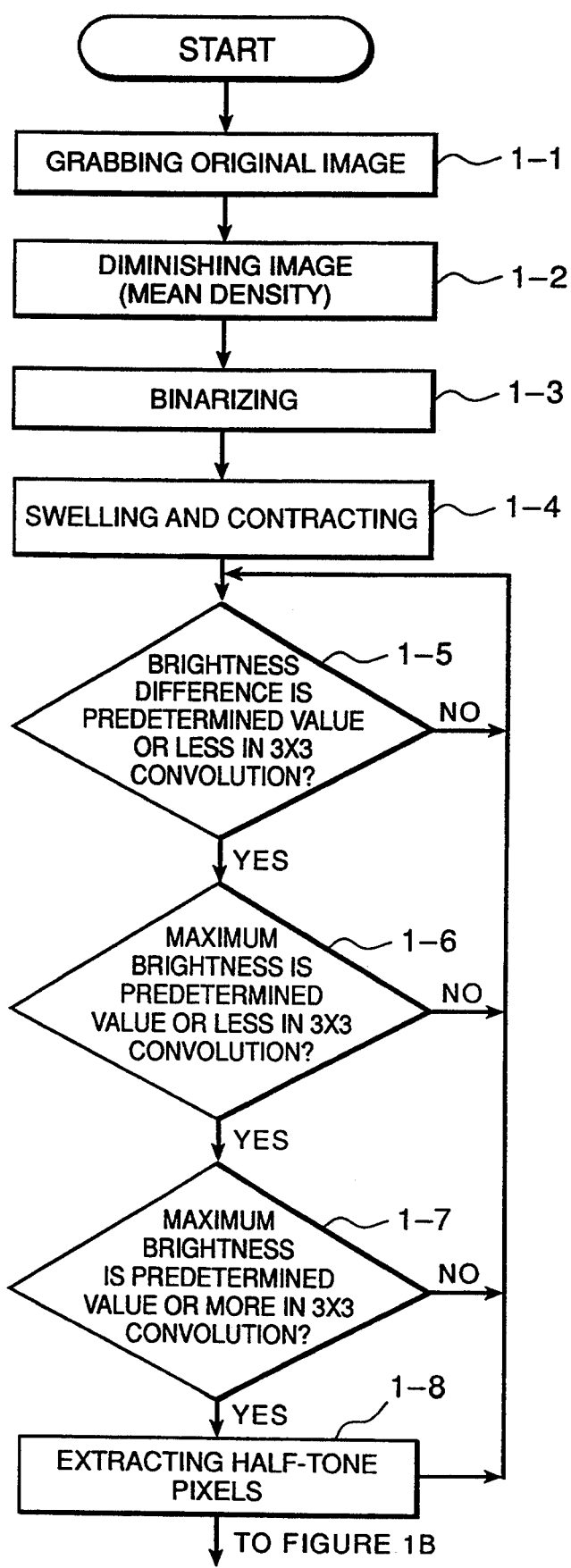
FIGS. 1A and 1B are a flow chart of a first embodiment of the present invention.
Figure 1B:
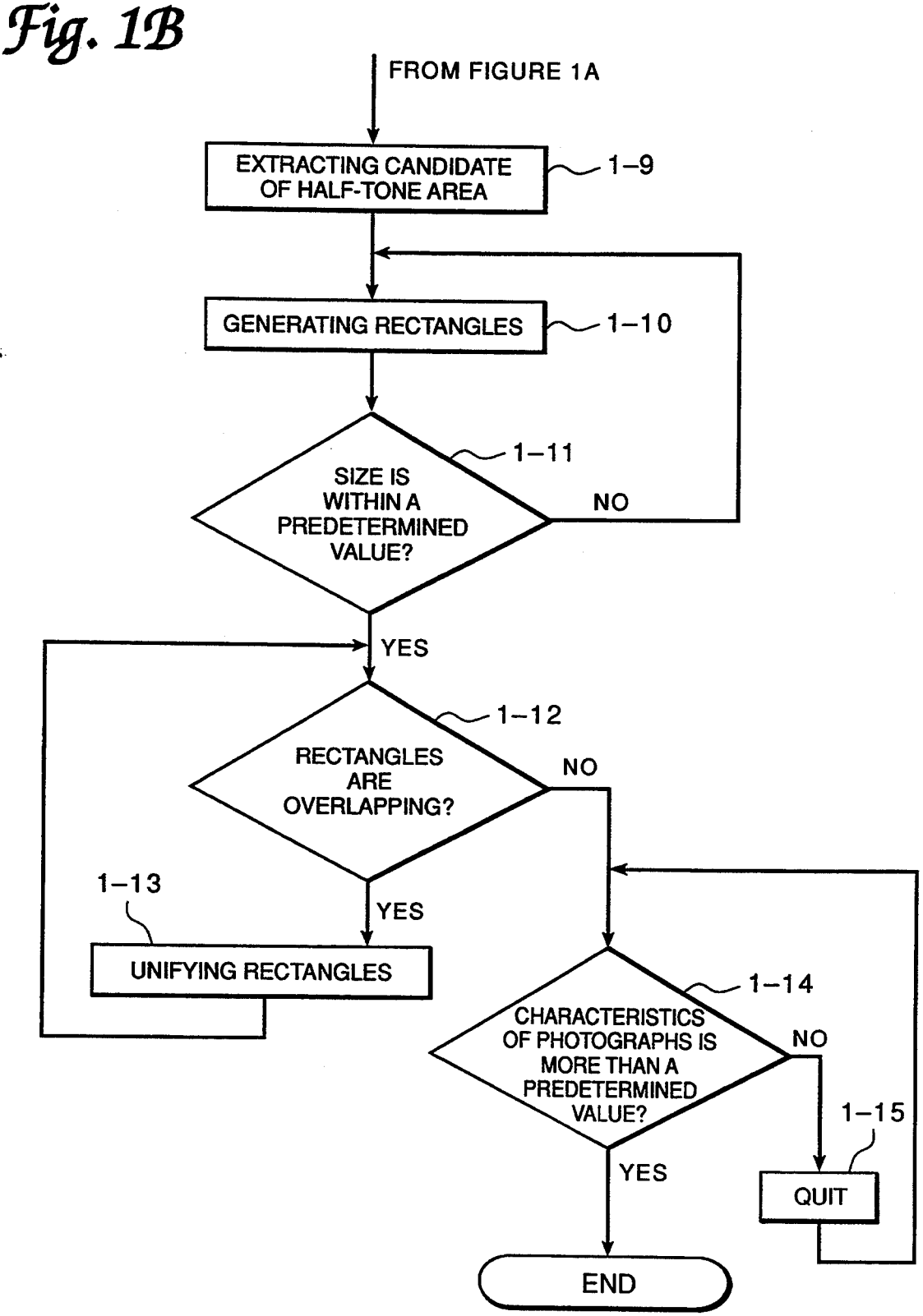

In the flow chart in FIGS. 1A and 1B, a script is read by an input means such as a scanner in step 1-1 and is contracted to a proper size on step 1-2. A dither scale image is transformed into a gray scale image, and a dither photograph processes according to the half-tone area of the contraction. Furthermore, the contraction makes it possible to reduce the memory consumption requirements for the following processing and to effectuate the noise reduction caused of flattering.

A reduction ratio of ⅛ (50 dots/inch) or less is preferable for an input image of 400 dots/inch, in order to express a dither image with 65 lines as a gray scale image. A reduction ratio of 1/16 is usually used in practice. On contraction, the predetermined size of on area is generally represented by one pixel. In this case, the mean density of the area is given to the representative pixel intending to store the gray information of whole of the image as much as possible.

Binarizing the contracted image on step 1-3, the image then is expanded and contracted in order for the area on the periphery of a half-tone area to be divided clearly on step 1-4. The characters close to a photograph which describe or explain it may be regarded as the photograph. In this case the characters also are processes as a half-tone area, and consequently, they are blurred. To prevent this possibility, such a character area is deleted by expansion giving priority to high brightness and contraction into the same size before the expansion. The photograph area with low brightness is clearly divided through the steps. Simultaneously, the number of groups is reduced because of the configuration fusion and noise is also reduced.

On steps from 1-5 to 1-8, whether the center pixel is a half-tone pixel or not is judged by every 3×3 convolution of the contracted image obtained on step 1-2. The judgment if it is a half-tone pixel or not depends on not only the density of its pixel but also the density distribution. Therefore, convolution processing of the pixel is necessary.

In step 1-5, it is judged the difference between the maximal brightness and the minimal brightness of the pixels in a convolution, that is, the difference of the brightness, is equal to or under the predetermined value or not is determined.

Figure 5:
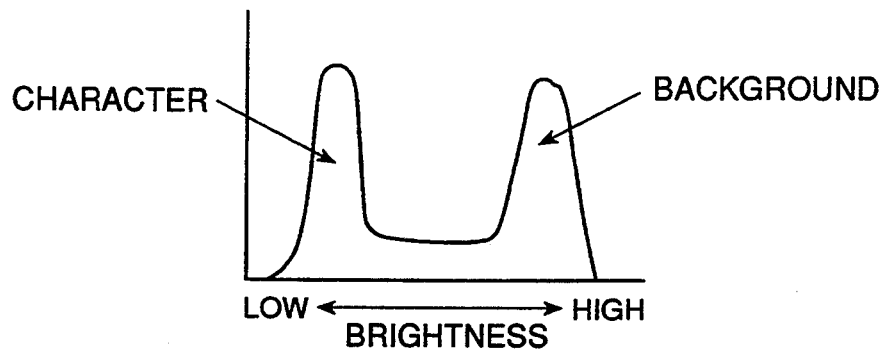
FIG. 5 is a histogram of brightness in an image including characters and background.
Figure 6:
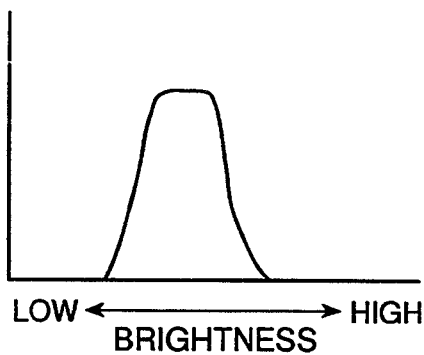
FIG. 6 is a histogram of an image consisting of photos and figures.
Figure 7:
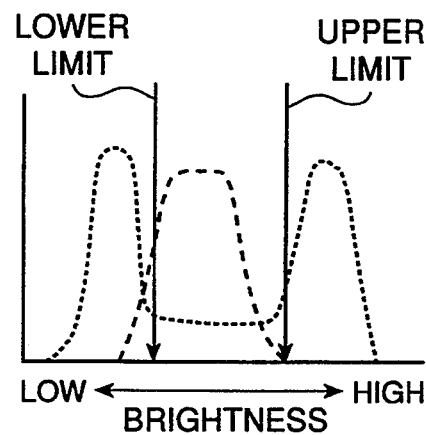
FIG. 7 shows upper and lower limits for the histogram in FIG. 6.

As shown in FIGS. 5 and 6, the brightness of the half-tone area of a photograph changes gradually. This means that the difference of brightness is effective indicator.

The upper and lower limits of brightness distribution are evaluated in steps 1-6 and 1-7. Here, the center pixels in a convolution with the upper limit equal to or more than a predetermined value a excepted from the half-tone pixels and white area in the background is reduced. Also, the center pixel in a convolution with the lower limit equal to or less than the predetermined value is excepted from the half-tone pixels and the area of a large character is deleted.

The pixels which satisfies the conditions in steps 1-5 to 1-7 are extracted as a half-tone pixels in step 1-8, and the half-tone pixels are counted every area in the binarized image obtained in step 1-4. The unit area to be regarded as a candidate of the half-tone area in step 1-9 is the one whose proportion of the counted value to the total number of pixels is equal to or more than a predetermined value. The circumscribed minimal rectangle of the area judged as a half-tone area of a configuration (FIGS. 2(a), (b) and (c)) is generated on step 1-10 as shown in FIGS. 3(A), (B) and (C). High speed memory control can be facilitated by treating the area by a rectangle for processing purposes, consequently, the overall processing speed can be progressed as a whole.

Calculating the summation of two neighboring sides of a rectangle in step 1-10. The method determines whether the summation is within the predetermined value in step 1-11. Here, when the length of a side of a rectangle is equal to or below a predetermined value, what is in a circumscribed rectangle is not recognized as a photograph or a configuration because it does not satisfy the size of a normal photograph or a configuration. In this case, the processing returns to step 1-10. It is possible to adopt the processing to exclude the area in a circumscribed rectangle from that of a half-tone area when the proportion of its long side to its short side (or its short side to its long side) is abnormal.

Figure 3:
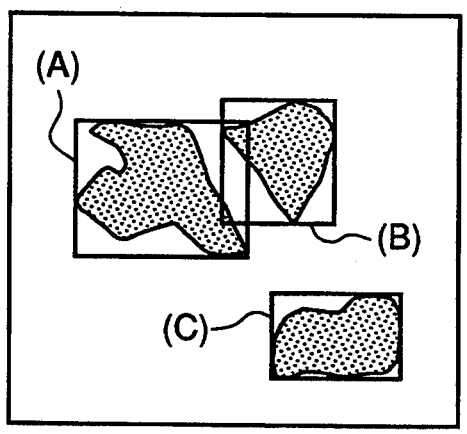
FIG. 3 shows rectangles for the picture areas in FIG. 2.
Figure 4:
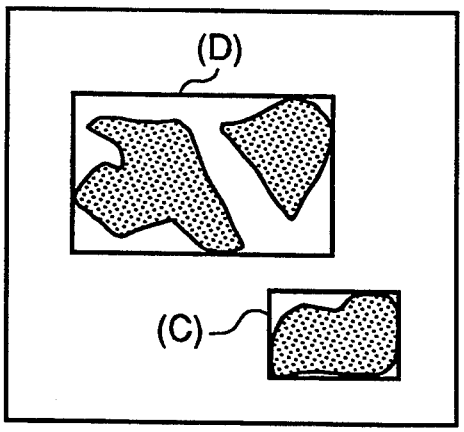
FIG. 4 shows a unified rectangle obtained from rectangles in FIG. 3.

When a plural number of rectangles exist, the method determining whether they are partially overlapping or not on step 1-12. In FIG. 3, rectangles (A) and (B) are overlapping partially. In this case, both rectangles are integrated into one rectangle (D) on step 1-13. Usually, the overlapped half-tone areas are to be judged as one photograph or a configuration so as to recognize half-tone area without fail. Also, the division of area is simplified, the processing is performed at high speed, and the result is clear through the processing. Steps 1-12 and 1-13 are repeated until the rectangles no longer overlapping are not overlapped. When such overlap disappears, the processing on step 1-14 is performed.

Figure 8:
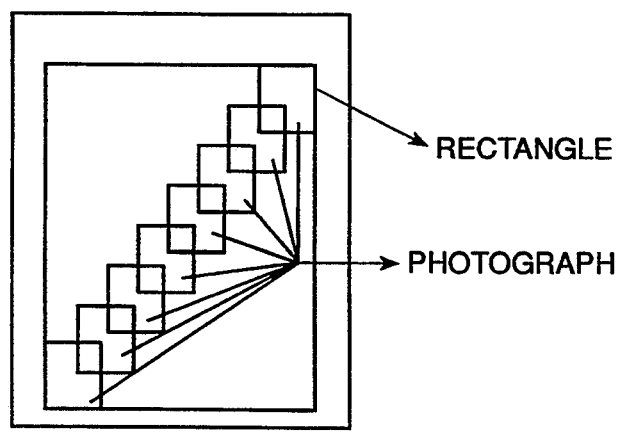
FIG. 8 shows an image of generated rectangles for which a special process may be necessary.

In step 1-14, the area of characteristic pixels of a photograph and a configuration is calculated with respect to all the divided rectangles and it is determined whether the area is equal to or less than a predetermined value. When the area is equal to or greater than the predetermined value, the processing is completed. There is a case that the area of pixels of a photograph or a configuration in the divided rectangle is below the predetermined value. It is conceivable that such a case is caused by the arrangement of photographs or configurations as shown in FIG. 8. In such a case, it is desirable to stop the extraction of the area of a photograph or a configuration and issuing a warning in step 1-15. The half-tone area of photograph or a configuration can be precisely distinguished from a configuration area of characters and background.

As mentioned above, it is possible to distinguish precisely the half-tone area of a photograph or a configuration from a configuration area of characters and background with respect to a copy machine and so forth which reads a set manuscript as an image.

Figure 9:
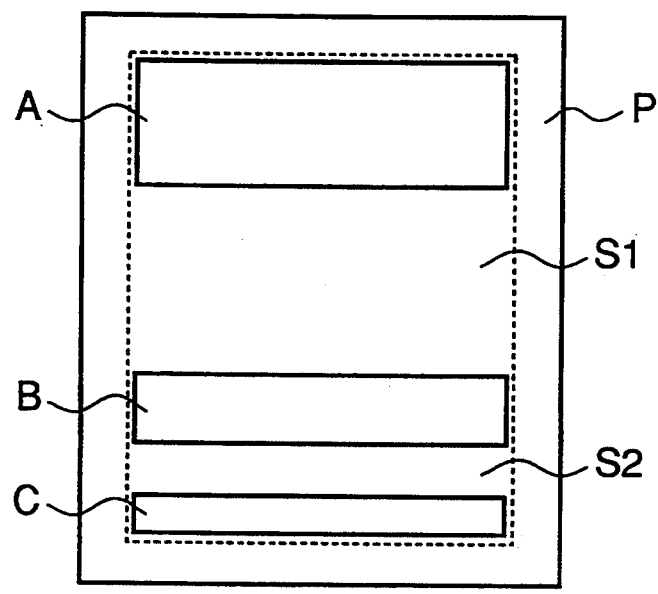
FIG. 9 shows an example of paper to be reproduced.

FIG. 9 shows a manuscript including vacant areas. Finding a vacant area, it has to be considered that (1) the up, bottom, right and left margins (shown by "P") are not to be used for finding a vacant area, and (2) when a plural number of vacant area (as shown by "S1" and "S2") exist, the objective is to find the maximal vacant area is to.

In FIG. 9, the vacant areas S1 and S2 are among the areas of A, B and C already containing written characters or drawings. Each of A, B and C are hereinafter called a "configuration area". All of the areas are wide area and have approximately the maximal width of the page. Most manuscript having vacant areas and written characters having such a style. When another manuscript or drawing is input, the maximal vacant area is to be extracted. In FIG. 9, S1 and S2 have the same width and S1 is longer than S2. Therefore, S1 is the maximal vacant area to be extracted.

FIGS. 10A–10D show a flow chart of the processing for extracting a vacant area. First, an image of a manuscript is input in step 2-1. The size of the image is adjusted properly on step 2-2. After the size adjustment, noise is reduced in step 2-3 and optimally binarized in step 2-4. Here, the margins "P" is painted by configuration pixels so as to exclude it from being included in vacant areas in step 2-5.

The processings described below determine whether the part of the image obtained by the above processings is a vacant area or not. Integrating above processings and below processing, a final vacant rectangle area is extracted.

Figure 11:
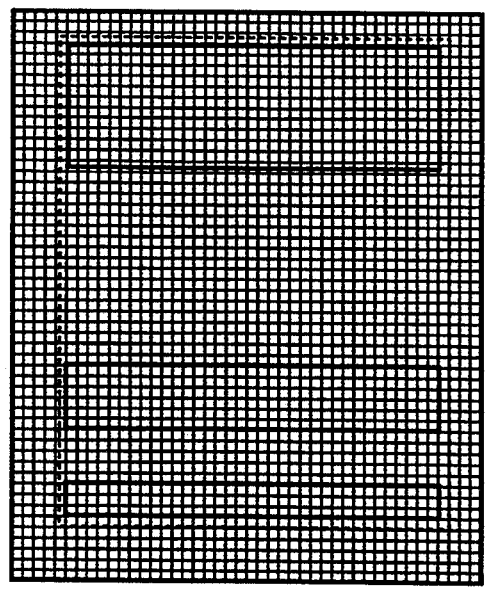
FIG. 11 shows an image of the paper in FIG. 10 divided into unit areas.
Figure 10A:
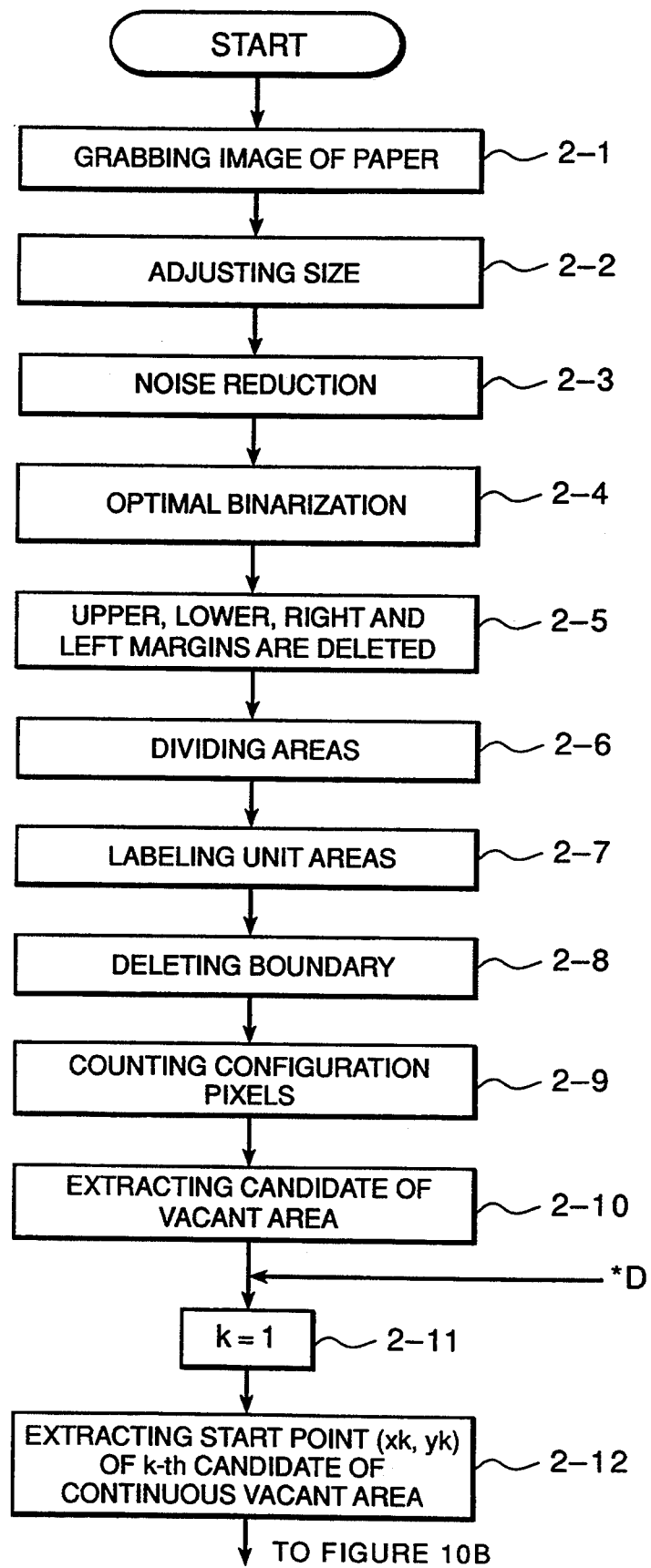
Figure 10B:
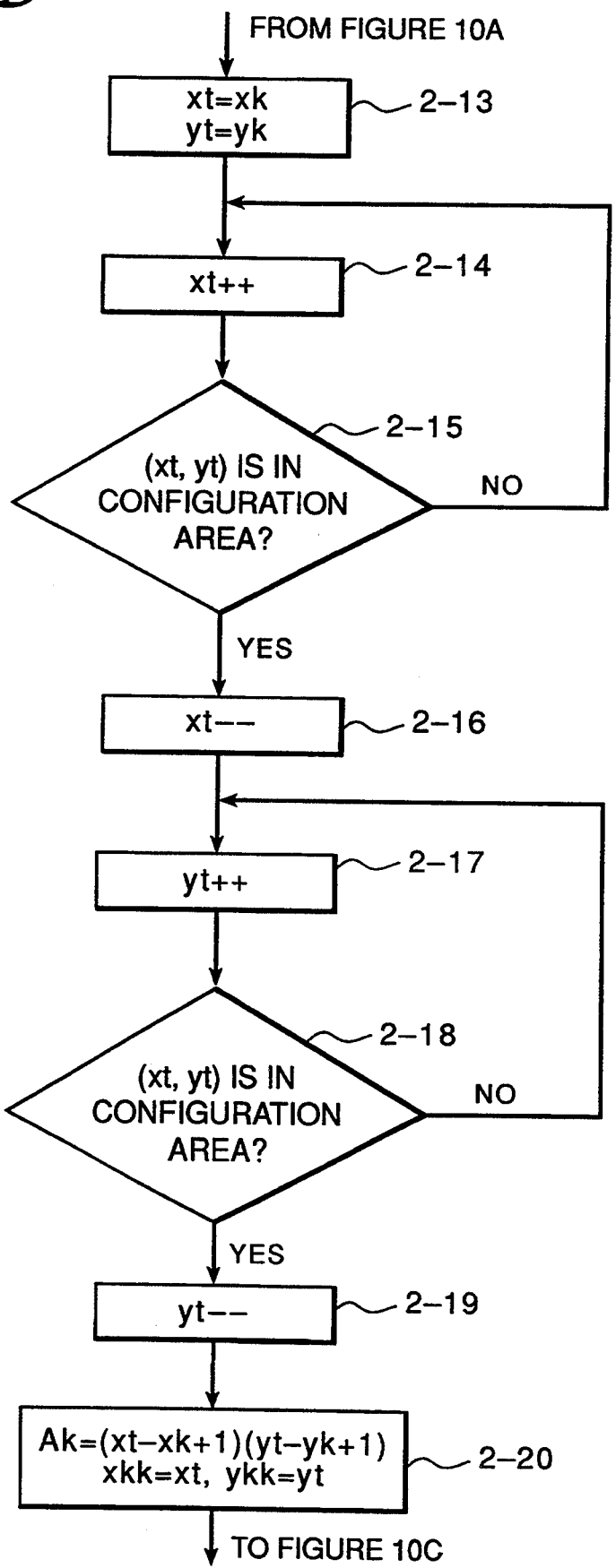
Figure 10C:
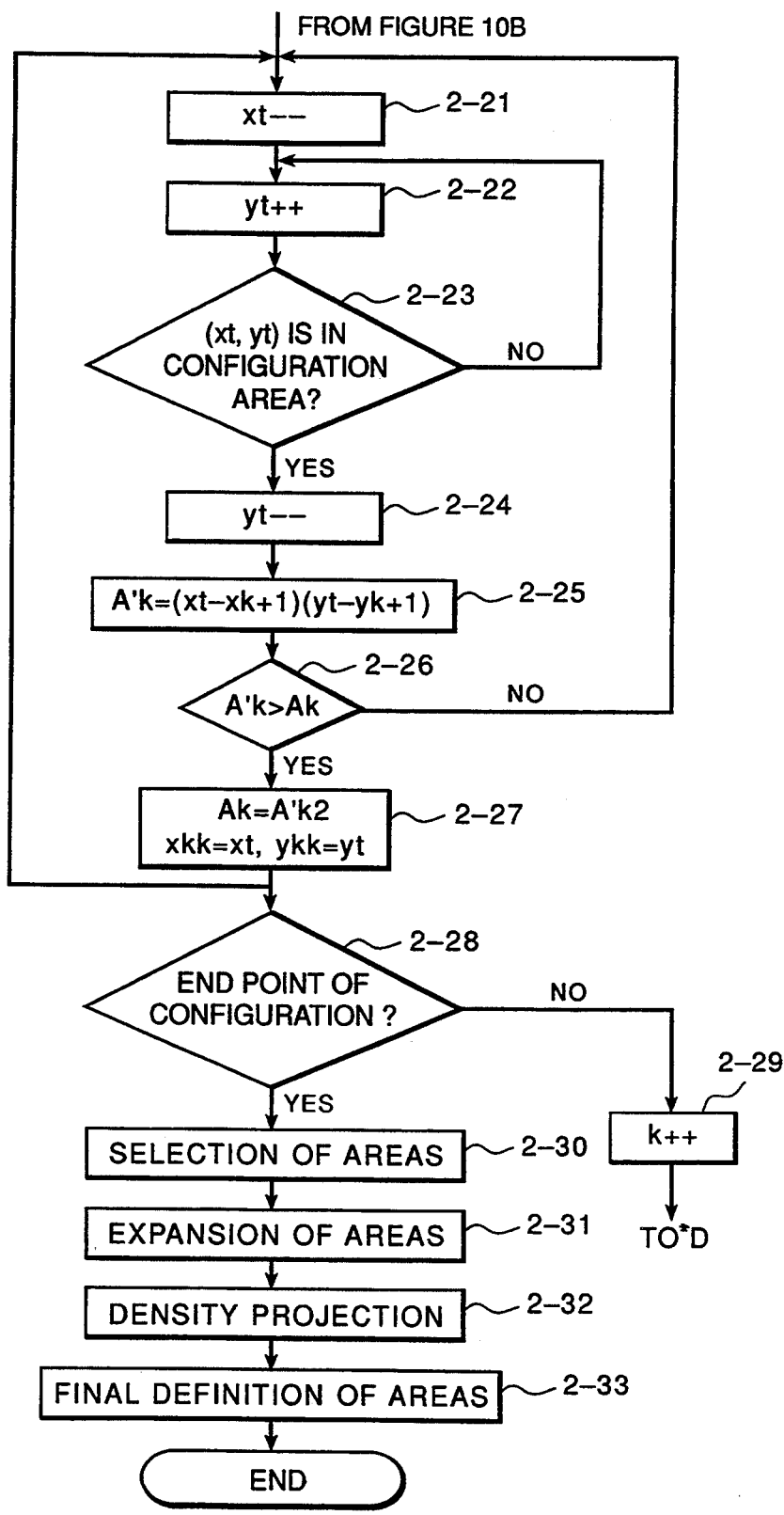

After dividing the image of the area through the border line with predetermined density into areas having a predetermined unit area of 16×16 pixel, for example, in step 2-6 in FIG. 11, the areas are labeled in step 2-7. Each area can be designated by a label and it is possible to combine the determinations of each area. Here, the border line is deleted by the expansion of each area on step 2-8.

Whether an area is vacant or not is determined according to the number of configuration pixels in the area. When the number of configuration pixels is equal to or less than a predetermined value (several percent less, for example), the unit area is regarded as a candidate of a vacant area in steps 2-9 and 2-10.

It is necessary for the area to be consecutive and unbroken in order to insert another manuscript or drawing. Considering the requirements of size adjustment and positioning. A rectangle is preferable. The insertion is easy as the rectangle large. The size of a rectangle is considered taking the area, the length of the longer side of the rectangle, the summation of both the longer and the shorter sides, etc. as a barometer. Here, area is adopted in the same domain and the length of the longer side is adopted in the different area as a barometer.

In and after step 2-10, consecutive candidates of vacant areas are integrated into a rectangle for insertion. This combining is positioned by evaluating the size of the rectangle with the start point of the upper left point in each candidate of consecutive vacant area. The start point of each area is detected by raster scanning the image. The maximal area of a rectangle is calculated in a candidate of a consecutive vacant area through processings as described below.

Figure 12:
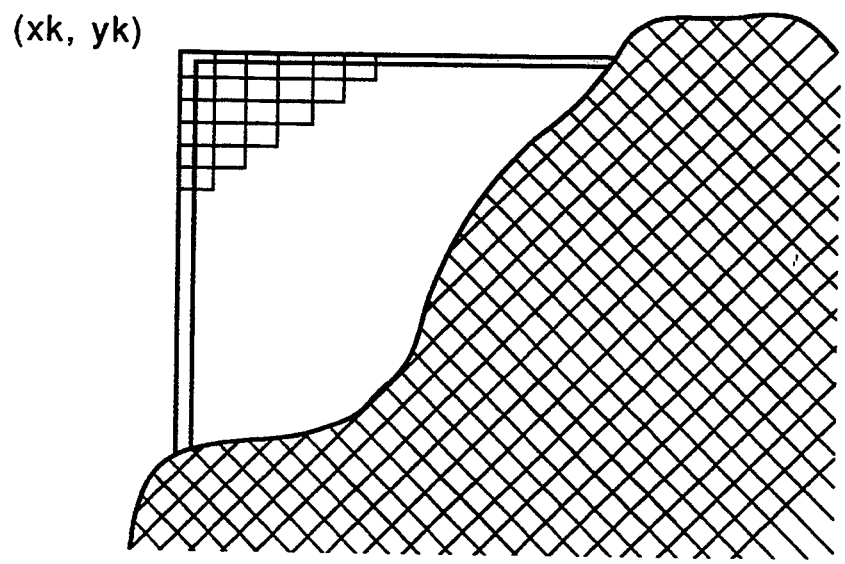
FIG. 12 shows a candidate portion of a vacant area and a start point thereof.
Figure 13:
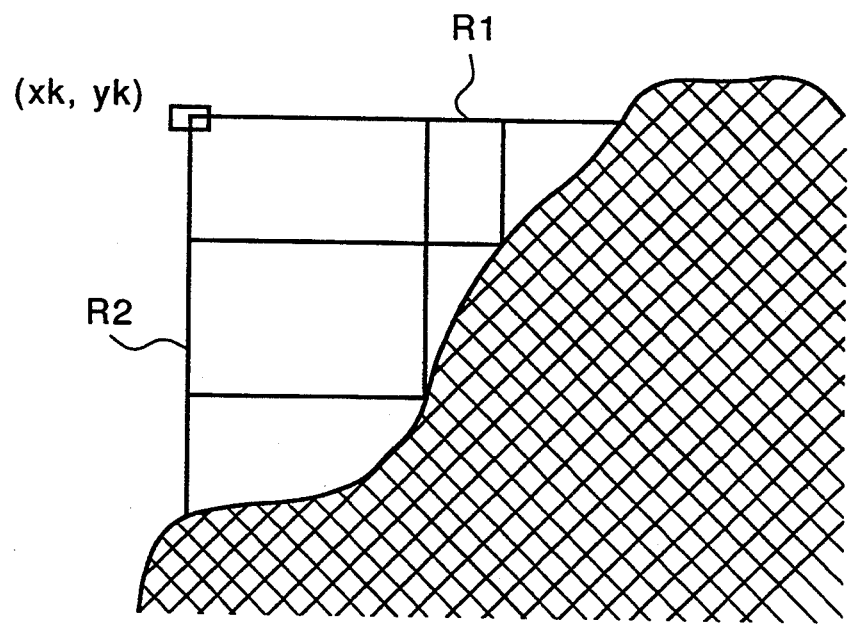
FIG. 13 shows a plurality of rectangles defined in one candidate area in FIG. 12.

As shown in FIG. 12, when the start point (xk, yk) is found in steps 2-11 and 2-12, the area of all rectangles with the start point are calculated. As shown in FIG. 13, one can define a plural number of rectangles, such as R1 and R2, with the same start point and touching a configuration area on a different point. The rectangles are evaluated in sequence.

With respect to an area, setting the initial value of coordinates of the start point of scanning in step 2-13, the consecutive area is scanned from the left to the right and from the upper side to the bottom side. The end point in the right-hand direction in the candidate of the vacant area is detected by increasing the numerical value of "xt" in step 2-14. The detection is continued further. When the detecting point moves into in a configuration area (in step 2-15), the point backs to the candidate area up one pixel into the vacancy (in step 2-16) and the detection in the y-direction is started (in step 2-17). When the detecting point for the y-direction moves into a configuration area (in step 2-18), it backs up to pixel into the candidate area of the vacancy (in step 2-19) and the area of the rectangle designated by the previous steps is calculated in step 2-20. The diagonal point (xkk, ykk) of the start point is then registered.

The vacant area to be detected is presupposed as shown in FIG. 12. With respect to rectangles with the same start point as shown, the length of a side in the x-direction and under the start point is no longer than the one detected at first. Even when the area includes a convex part with the length longer than the one detected at first in the x-direction, the longer part cannot be detected by the method in this application. That is, a rectangle with a side longer than the one detected at first trespasses the configuration area.

In the case in which the shape of the vacant area is of a reverse type, the detection is performed in reverse, setting the start point on the right side of the vacant area.

Considering this fact, what is examined hereafter is a rectangle with shorter sides in the x-direction and longer sides in the y-direction.

Decreasing "xt" (in step 2-21), the point in y-direction is detected (in step 2-22). When the detecting point moves into a configuration area (in step 2-23), it once backs up one pixel into the candidate area of the vacancy (in step 2-24) and the area of the rectangle designated by the previous step is calculated in step 2-25.

The area is renewed by larger one successively including aforementioned first area in step 2-20, as well as the coordinates of the point in diagonal direction on step 2-27.

Repeating the above processings from steps 2-12 to 2-27 through step 2-29, the operation is completed when (xt, yt) reaches to the end point of the candidate area of vacancy in step 2-28.

The maximal area of the rectangle is calculated through the above steps with respect to each consecutive area and the area optimal to be inserted is selected among the rectangles in each consecutive area in step 2-30. The rectangle to be selected is the one with the maximal length on its longer side. The vacant area which is wide or long is selected with priority.

Generating an expanded image of the selected vacant area (in step 2-31), the density projection in the x-direction and in the y-direction is calculated (in step 2-32). The border line between a vacant area and a configuration area is clarified, and the maximal vacant area is defined (in step 2-33) thereby preventing the trespass on the configuration area.

As mentioned above, the area classification method of an image of the present invention divides an image of a manuscript, divides an image into predetermined size of unit area, counts the configuration pixels in each unit area, regards the consecutive unit area with configuration pixels equal to or less than the predetermined value as a candidate of a vacant area, and recognizes the maximal horizontal rectangle (not rotated, inclined or declined) which internally touches the candidate area as a vacant area. Therefore, the optimal vacant area to be inserted with another image can be extracted.

Figure 14:
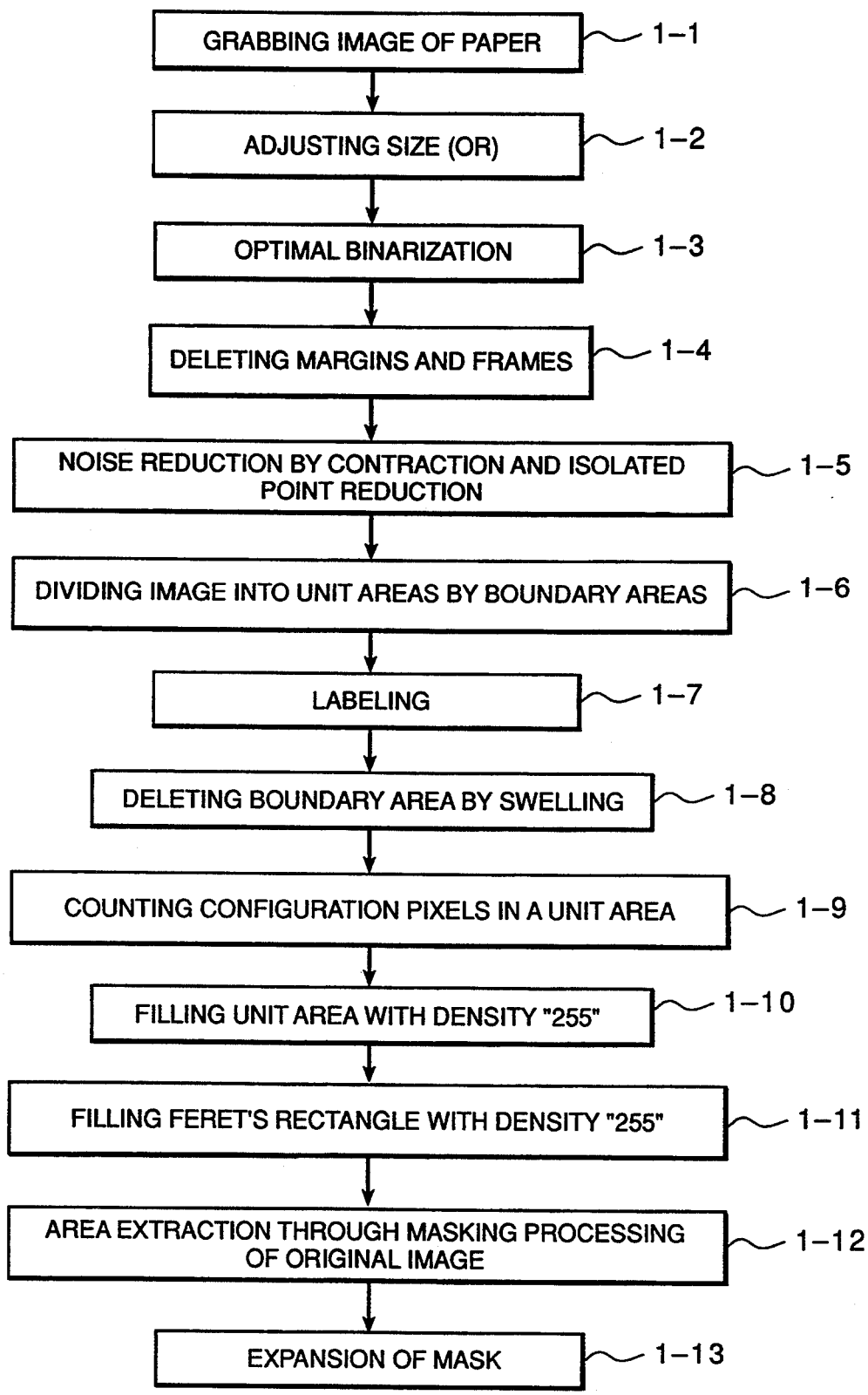
FIG. 14 is a flow chart of a third embodiment of the present invention.

FIG. 14 shows a flow chart of the processing for extracting a configuration area. First, a manuscript to be inserted into another one is input and read through an input means such as a scanner in step 1-1 and the size of the input image is adjusted properly for the processings in the following steps in step 1-2. For example, suppose the output image of the scanner has 4096×4096 pixels and the image to be processed in an image processing means has the capacity of 1024×1024 pixels; then the image must be contracted into ¼ of its original size. In this contraction, the configuration pixel surely remains without unintended deletion by calculating a bitwise OR of the predetermined convolution.

Next, the histogram of the image is calculated and binarized by an optimal threshold in step 1-3, and noise is reduced in steps 1-4 and 1-5. There are efficient ways to calculate the optimal threshold: a) regarding the center value of the density as the optimal threshold, b) a mode method, c) a discrimination analysis method, d) a p-tyle method, etc. When noise is reduced, all margins of the manuscript are painted by the pixels whose density are "0" (in step 1-4) and they are excluded from the configuration area. The noise in the margins is reduced simultaneously. As it is necessary to leave configuration pixels selecting in other areas, noise is reduced by a processing technique such as isolated point reduction, shrinking, median filter, and so forth (in step 1-5).

Figure 2:
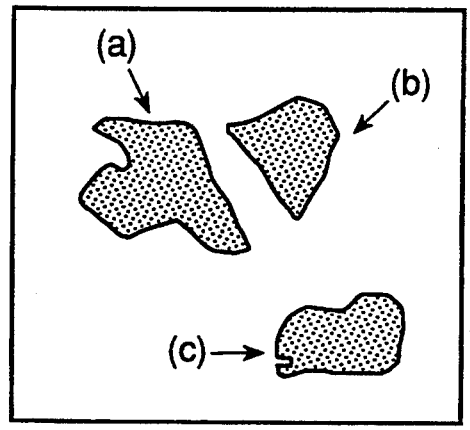
FIG. 2 is an explanatory diagram of a picture or photo areas in an image.

The image obtained through the above steps shown in FIG. 2 is divided into unit areas and the method determined whether every unit area is a configuration area or not.

Figure 16:
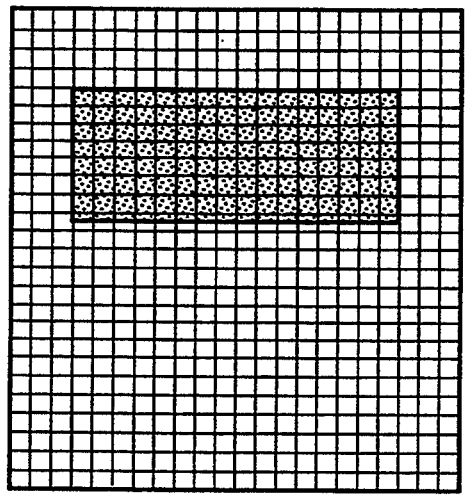
FIG. 16 shows an image of the pattern in FIG. 15 divided into areas.

In order to divide the image into the unit area (16×16 pixels, for example), the boundary line is formed with a density "0" (in step 1-6) as in FIG. 16, the area divided by the boundary line is labeled (in step 1-7), and simultaneously, the boundary line is deleted by expanding each area (in step 1-8). Each area is specialized and the judgment determination of each area can be combined in this way.

The method determines whether an area is configuration area or not according to the number of configuration pixels in each area. When the number of configuration pixels is equal to or greater than a predetermined value (several percent of the area, for example), the unit area is regarded as a candidate of a configuration area (in step 1-9).

Figure 15:
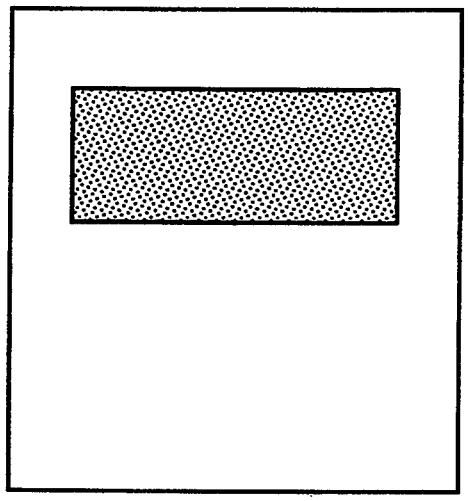
FIG. 15 shows an image of a paper into which another image is to be inserted.
Figure 17:
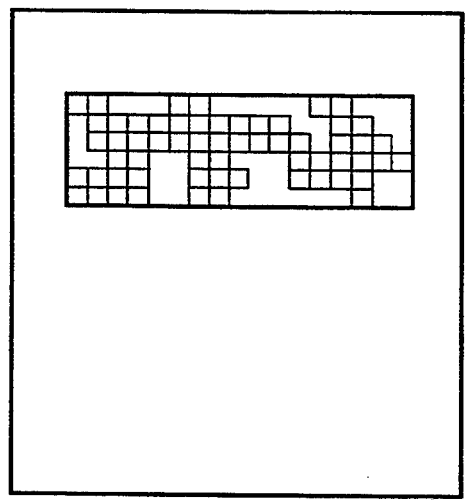
FIG. 17 shows unified candidates of a picture area.

The area extracted as a candidate of configuration area is painted by a predetermined value ("255", for example) and distinguished clearly from the vacant area (in step 1-10). The shape of the area obtained here is flexible. Therefore, the area obtained here is inconvenient for evaluating size and inserting another image. Regarding the candidates of configuration area as one group, its Feret's configuration is calculated and the entire configuration areas are painted with density "255" (in step 1-11) in order to solve the problem. The minimal horizontal rectangle including a configuration area is obtained (as shown in FIG. 17). The configuration areas are extracted by using the horizontal rectangle as a mask pattern (in step 1-13). Switching according to a mask image, and an AND operation of the mask image and the image in FIG. 15 can be adopted for the mask processing. As the mask may be smaller than the configuration area because pixels of a configuration area are deleted by the noise reduction, the peripheries of the mask in FIG. 17 can be expanded by a predetermined size (on step 1-12).

In this way, the configuration area can be precisely extracted and insertion is facilitated by extracting a configuration area as a horizontal rectangle.

An image area classification method binarizes an input image of a manuscript, divides a binarized image into the predetermined size of unit area, counts the configuration pixels in each unit area, regards the consecutive unit area with configuration pixels equal to or greater than the predetermined value as the candidate of the configuration area, and recognizes the horizontal rectangle (not rotated, inclined or declined) which externally touches the candidate area as a configuration area. Therefore, it is possible to extract a configuration area to be inserted into another manuscript at high speed.

What is claimed is:

1. A method for classifying areas in an image to extract a half-tone area, said method comprising the steps of:
    for each pixel in said image, performing convolutions of a predetermined size with said each pixel as a center pixel in said convolutions, thereby determine a maximal convolution brightness and a minimal convolution brightness for said pixel;
    calculating a brightness difference between said maximal and minimal convolution brightnesses of said center pixel;
    defining the center pixel as a half-tone pixel when said difference is less than or equal to a first predetermined value, said maximal brightness is less than or equal to a second predetermined value and said minimal brightness is greater than or equal to a third predetermined value;
    counting a number of half-tone pixels within a given area; and
    defining areas in said image as half-tone areas when said number of half-tone pixels is greater than or equal to a fourth predetermined value.

2. The method of claim 1, further comprising a step of reducing said image before performing the center pixel defining step.

3. The method of claim 2, wherein said image is reduced so that a distance between adjacent pixels in the reduced image is approximately within the range 0.5 mm to 1.0 mm.

4. The method of claim 1, further comprising a step of swelling and contracting said image, thereby deleting a character area in a peripheral region of a half-tone area.

5. The method of claim 1, wherein said area defining step comprising a step of defining a rectangle of minimal area circumscribing said half-tone areas.

6. The method of claim 1, further comprising a step of defining a rectangle of minimal area circumscribing a plurality of rectangles overlapping each other.

7. The method of claim 1, further comprising a step of deleting a rectangle from half-tone areas when said rectangle has a side which is shorter than a predetermined length.

8. The method of claim 1, wherein said area defining step comprises a step of prohibiting a rectangle from being defined as one of said half-tone areas when a proportion of a vertical side of said rectangle to a horizontal side thereof is outside a predetermined range.

9. A method of classifying areas in an image to identify vacant areas, said method comprising the steps of:
    binarizing said image;
    dividing said image into a plurality of unit areas each having a predetermined size;
    counting a number of configuration pixels in each unit area;
    defining a vacant area candidate which includes said unit areas when said number of configuration pixels in each unit areas in said area candidate is less than or equal to a predetermined value; and
    defining a vacant area by a rectangle having a maximal characteristic among rectangles inscribing said area candidate.

10. A method for classifying areas in an image to extract a vacant area, said method comprising the steps of:
    binarizing said image;
    dividing said image into a plurality of unit areas with predetermined size;
    counting a number of configuration pixels in each unit area;
    defining a vacant area candidate which includes said unit areas when said number of configuration pixels in each unit areas in said area candidate is less than or equal to a predetermined value; and
    defining a vacant area by a rectangle which includes a maximum number of said unit areas among rectangles internally touching said candidate.

11. A method for classifying areas in an image to extract a configuration area, said method comprising the steps of:
    binarizing said image;
    dividing said image into a plurality of unit areas having a predetermined size;
    counting a number of configuration pixels in each unit area;
    defining a configuration area candidate including said unit areas when said number of configuration pixels of each unit area in said area candidate is greater than or equal to a predetermined value; and
    defining a configuration area by a rectangle circumscribed about said area candidate.

12. A method for classifying areas in an image to extract a configuration area, said method comprising the steps of:

binarizing said image;

dividing said image into a plurality of unit areas with predetermined size;

counting a number of configuration pixels in each unit area;

defining a configuration area candidate including said unit areas when said number of configuration pixels of each unit area in said area candidate is greater than or equal to a predetermined value;

defining a rectangle circumscribing said candidate area; and defining a configuration area including said rectangle, said configuration area being bigger than said rectangle.

13. The method of claim 9, further comprising a step of reducing a size of said image.

14. The method of claim 9, further comprising a step of reducing noise in said image.

15. The method of claim 9, further comprising a step of filling a border of said image with configuration pixels, thereby excluding said border from consideration as a vacant area.

16. The method of claim 9, wherein said characteristic is an area of said rectangle.

17. The method of claim 9, wherein said characteristic is a length of a longest side of said rectangle.

18. The method of claim 9, wherein said characteristic is a total length of a longest side of said rectangle and a shortest side of said rectangle.

19. The method of claim 9, said vacant area defining step comprising the steps of:

moving a corner of said rectangle in a first direction toward a non-vacant area of said image until said corner enters said non-vacant area;

moving said corner an amount in a direction opposite to said first direction so that said corner is in said non-vacant area;

moving said corner in a second direction toward said non-vacant area until said corner enters said non-vacant area; and moving said corner an amount in a direction opposite to said second direction so that said corner is in said non-vacant area.

20. The method of claim 9, further comprising a step of generating a density projection of said rectangle; and determining a border line between said vacant area and a non-vacant area of said image using said density projection.

21. The method of claim 20, wherein said density projection is a two-dimensional density projection.

22. The method of claim 11, further comprising a step of reducing said image.

23. The method of claim 11, said binarizing step comprising a step of calculating a histogram of said image.

24. The method of claim 11, wherein said binarizing step is performed using an optimal threshold based on a center density value.

25. The method of claim 11, wherein said binarizing step is performed using an optimal threshold selected using a mode method.

26. The method of claim 11, wherein said binarizing step is performed using an optimal threshold selected using a discrimination analysis method.

27. The method of claim 11, wherein said binarizing step is performed using an optimal threshold selected using a p-style method.

28. The method of claim 11, further comprising a step of setting pixels in a border of said binarized image to zero density, thereby eliminating said border from consideration as a configuration area.

29. The method of claim 11 further comprising a step of reducing noise in said binarized image using an isolated point reduction technique.

30. The method of claim 11 further comprising a step of reducing noise in said binarized image using a shrinking technique.

31. The method of claim 11 further comprising a step of reducing noise in said binarized image using a median filter technique.

32. The method of claim 11 further comprising a step of extracting said configuration area using said rectangle as a mask image.

33. The method of claim 32, wherein said extracting step comprises a step of switching an image signal according to said mask image.

34. The method of claim 32, wherein said extracting step comprises a step of ANDing bits in said image with bits in said mask image.

35. The method of claim 32, further comprising a step of:

reducing noise in said binarized image;

wherein said extracting step comprises a step of expanding said mask image to include pixels eliminated in said noise reduction step.

* * * * *